United States Patent
Shu et al.

(10) Patent No.: US 10,944,233 B2
(45) Date of Patent: Mar. 9, 2021

(54) POLARIZED FIBER-LASER

(71) Applicant: Coherent, Inc., Santa Clara, CA (US)

(72) Inventors: Qi-Ze Shu, Cupertino, CA (US); Andrea Caprara, Palo Alto, CA (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 16/000,090

(22) Filed: Jun. 5, 2018

(65) Prior Publication Data
US 2019/0013638 A1    Jan. 10, 2019

Related U.S. Application Data

(60) Provisional application No. 62/530,457, filed on Jul. 10, 2017.

(51) Int. Cl.
| | |
|---|---|
| *H01S 3/067* | (2006.01) |
| *H01S 3/094* | (2006.01) |
| *H01S 3/00* | (2006.01) |
| *H01S 3/23* | (2006.01) |
| *H01S 3/16* | (2006.01) |

(52) U.S. Cl.
CPC ........ *H01S 3/06712* (2013.01); *H01S 3/0071* (2013.01); *H01S 3/067* (2013.01); *H01S 3/0675* (2013.01); *H01S 3/06754* (2013.01); *H01S 3/094003* (2013.01); *H01S 3/0092* (2013.01); *H01S 3/1618* (2013.01); *H01S 3/2308* (2013.01)

(58) Field of Classification Search
CPC .......... H01S 3/067–06795; H01S 3/2308–235; H01S 3/1618; H01S 3/0092; H01S 3/10061; H01S 3/1308
See application file for complete search history.

(56) References Cited

U.S. PATENT DOCUMENTS

| | | | | |
|---|---|---|---|---|
| 5,450,427 | A * | 9/1995 | Fermann | H01S 3/0675 372/10 |
| 5,880,877 | A * | 3/1999 | Fermann | H01S 3/06754 359/341.31 |
| 5,923,686 | A | 7/1999 | Fermann et al. | |
| 6,072,811 | A * | 6/2000 | Fermann | H01S 3/067 372/105 |
| 8,995,478 | B1 | 3/2015 | Kobtsev et al. | |
| 2004/0213302 | A1* | 10/2004 | Fermann | H01S 3/106 372/6 |
| 2006/0171426 | A1 | 8/2006 | Starodoumov et al. | |

(Continued)

OTHER PUBLICATIONS

Friedman et al., "The Use of the Principal States of Polarization to Describe Tunability in a Fiber Laser", IEEE Journal of Quantum Electronics, vol. 33, No. 5, May 1997, pp. 642-648.

(Continued)

*Primary Examiner* — Tod T Van Roy
*Assistant Examiner* — Sean P Hagan
(74) *Attorney, Agent, or Firm* — Morrison & Foerster LLP (57) ABSTRACT

A fiber-laser includes a gain-fiber in a laser-resonator. A polarizer is located in the laser-resonator at an end thereof, causing the output of the fiber-laser to be linearly polarized. A wavelength-selective element is also included in the laser-resonator for selecting an output wavelength of the fiber-laser from within a gain-bandwidth of the gain-fiber.

18 Claims, 6 Drawing Sheets

(56) References Cited

U.S. PATENT DOCUMENTS

2009/0097515 A1* 4/2009 Harter .................. H01S 3/1643
372/25
2014/0204964 A1 7/2014 Simanovski et al.

OTHER PUBLICATIONS

Ghera et al., "Polarization Related Phenomena in Nd-Doped Fiber Lasers", Optical Materials, vol. 4, Dec. 1994, pp. 73-80.
Yang et al., "Broadband Laser Polarization Control with Aligned Carbon Nanotubes", Nanoscale, vol. 7, 2015, pp. 11199-11205.
International Search Report and Written Opinion Received for PCT Patent Application No. PCT/US2018/036606, dated Sep. 28, 2018, 10 pages.

* cited by examiner

POLARIZED FIBER-LASER

PRIORITY CLAIM

This application claims priority to U.S. Provisional Application Ser. No. 62/530,457, filed Jul. 10, 2017, the disclosure of which is incorporated herein in its entirety.

TECHNICAL FIELD OF THE INVENTION

The present invention relates in general to fiber-lasers. The invention relates in particular to fiber-lasers arranged to deliver plane-polarized laser-radiation.

DISCUSSION OF BACKGROUND ART

Optically-pumped fiber-lasers are robust sources of laser-radiation, which can be designed to use optical pump radiation with relatively high efficiency compared with other solid-state lasers. Fiber-lasers delivering continuous-wave (CW) laser-radiation at output powers exceeding 1 kilowatt (kW) are commercially available. These high average powers, combined with relatively good reliability and low maintenance, make fiber-lasers the preferred laser-radiation source for many industrial material-processing applications.

Radiation delivered by fiber-lasers typically has a fundamental wavelength in the near infrared (NIR) region of the electromagnetic spectrum. The spectral bandwidth fiber-laser radiation is relatively broad compared to the spectral bandwidth of radiation delivered by other solid-state lasers. By way of example, an ytterbium ($Yb^{3+}$) doped fiber-laser delivers radiation at a nominal wavelength between about 1030 nanometers (nm) and 1100 nm, with a typical spectral bandwidth of about 3 nm. Laser-radiation delivered by fiber-lasers, in a simplest form, is unpolarized or randomly polarized.

None of the above discussed fiber-laser characteristics is disadvantageous for processes in which the laser-radiation is required only to provide a precisely deliverable source of NIR radiation, for example for welding, drilling, or cutting materials opaque to NIR radiation. However, for cutting materials that are substantially transparent to NIR radiation, such a silicon (Si), or substantially reflective to NIR radiation, such as copper (Cu), the fundamental-wavelength radiation must be frequency-converted in an optically nonlinear crystal to provide shorter-wavelength radiation. Optimal frequency-conversion usually requires that the fundamental-wavelength radiation be plane-polarized.

Fiber-lasers configured to deliver plane-polarized radiation are relatively complex and typically rely on using sections of polarization-maintaining fiber spliced into a fiber-oscillator arrangement. Polarization-maintaining fibers include a core surrounded by a cladding. Within the cladding are embedded sections of material dissimilar from the cladding material, in the form of rods or the like, arranged to provide an oriented stress in the core. The oriented stress provides an oriented stress-birefringence in the fiber which allows the core of the polarization-maintaining fiber to transmit and maintain plane-polarized radiation. A detailed description of several such fiber-laser arrangements and applicable polarization-maintaining fiber configurations is provided in U.S. Pre-Grant Publication No. 2006/0171426, assigned to the assignee of the present invention, and the complete disclosure of which is hereby incorporated herein by reference.

One practical disadvantage of fiber-laser arrangements described in the above incorporated reference is the relatively high cost of polarization-maintaining fiber compared with that of non-polarization-maintaining fiber. Another practical disadvantage is difficulty of splicing polarization-maintaining fiber sections to non-polarization-maintaining fiber sections. It would be advantageous if plane-polarized operation of a fiber-laser could be accomplished without incorporating any polarization-maintaining fiber in the laser arrangement.

SUMMARY OF THE INVENTION

In one aspect, fiber-laser apparatus in accordance with the present invention comprises a laser-resonator including a gain-fiber. The laser-resonator is terminated at first and second ends thereof by respectively first and second reflectors. A pump-radiation source is provided and is arranged to provide pump-radiation to the gain-fiber and cause the resonator to deliver laser-radiation. A polarizer is provided and is located between one of the reflectors and the gain-fiber. The polarizer is arranged to cause the laser-radiation delivered from the laser-resonator to be linearly-polarized. A wavelength-selective device is provided and is located in the laser-resonator for selecting the wavelength of the delivered radiation from within a gain-bandwidth of the gain-fiber.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
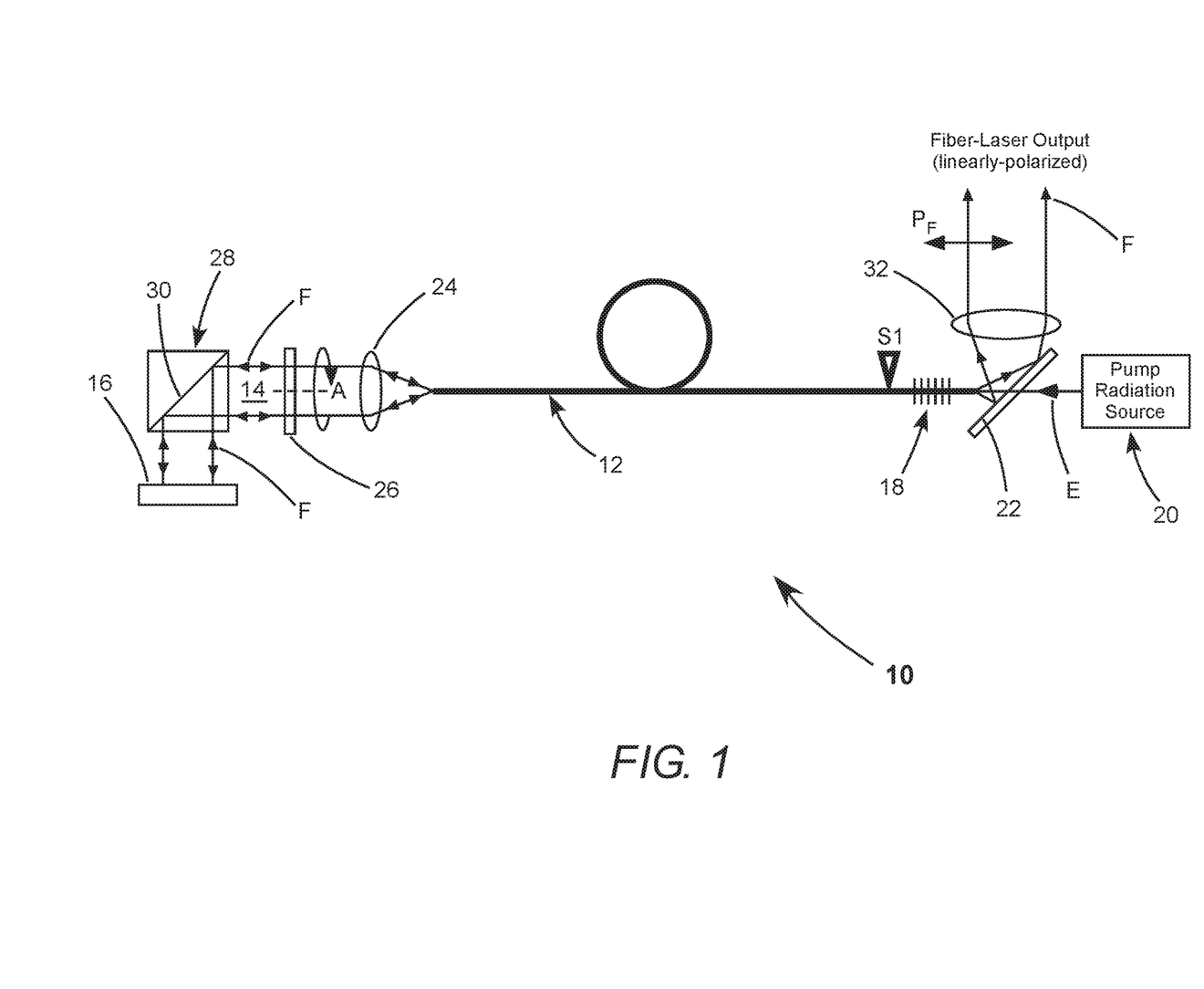
FIG. 1 schematically illustrates one preferred embodiment of a polarized fiber-laser in accordance with the present invention having a laser-resonator, including a gain-fiber, a polarizer, and a waveplate.

Turning now to the drawings, wherein like components are designated by like reference numerals, FIG. 1 schematically illustrates a preferred embodiment 10 of a fiber-laser in accordance with the present invention, arranged for delivering linearly-polarized laser-radiation. Polarized fiber-laser 10 includes a gain-fiber 12 that is not polarization maintaining. Gain-fiber 12 is preferably a single-mode gain-fiber. Gain-fiber 12 is included in a laser-resonator 14, formed between a plane reflector 16 and a fiber Bragg grating (FBG) 18, which are located at opposite ends of the resonator. FBG 18 is spliced to gain-fiber 12 at a location indicated by arrow S1. FBG 18 is partially reflecting and output laser-radiation from the polarized fiber-laser is transmitted through the FBG.

A pump-radiation source 20, such as a diode-laser bar package, delivers pump-radiation (indicated by arrow E) through a dichroic reflector 22, through FBG 18, and into gain-fiber 12. Focusing-optics for the pump-radiation are not shown in FIG. 1 for simplicity of illustration. Such focusing-optics are well known in the art and a detailed description thereof is not necessary for understanding principles of the present invention.

The pump radiation energizes gain-fiber 12, producing optical gain, which causes fundamental-wavelength radiation to circulate within resonator 14, as indicated by arrows F. FBG 18 preferably has a reflection bandwidth of about 0.5 nm or less. In addition to providing optical feedback by reflection, the FBG functions as a wavelength-selective element in resonator 14, selecting the fundamental wavelength of circulating radiation F from with the gain-bandwidth of gain-fiber 12.

At the opposite end of gain-fiber 12 from FBG 18, circulating radiation F exits the gain-fiber as a diverging beam, with a divergence determined by the numerical aperture (NA) of the gain-fiber. The diverging beam is collimated by a positive lens 24. The collimated beam passes through a waveplate 26, passes through a polarizer 28, and is reflected by plane reflector 16. Waveplate 26 can be adjusted about a rotational axis "A".

Waveplate 26 is preferably a half-waveplate. Polarizer 28 is depicted as a cube-prism polarizer having an internal polarization-selective surface 30. The collimated beam reflected from internal surface 30 is incident normally on plane reflector 16 and, accordingly, is directed back along the incidence beam-path into gain-fiber 12. Plane reflector 16 may be highly reflective at both the fundamental wavelength and the pump-radiation wavelength, so that any pump-radiation not absorbed in a first pass through gain-fiber 12 is reflected back into the gain-fiber.

In the absence of polarizer 28, the resonator would oscillate at a frequency set by FBG 18. In general, since gain and losses are polarization insensitive, the resonator would oscillate simultaneously in both polarization eigen-modes (eigen-polarizations) of the resonator. The output laser-radiation of the fiber-laser would be unpolarized. The eigen-polarizations of a fiber-laser terminated at each end with a mirror are, in general, linear at each end of the resonator, and, in general, elliptical at other locations within the fiber. The orientation of the linear eigen-polarization at each end of the gain-fiber depends on the geometric layout of the gain-fiber, due to bend-induced, torque-induced, and stress-induced birefringence.

By inserting polarizer 28 between gain-fiber 12 and reflector 16, aligned with either one of the two linear eigen-polarizations, that particular eigen-polarization will propagate through the polarizer without losses. Circulating-radiation in that particular eigen-polarization of the resonator will return after a roundtrip in the resonator to the polarizer in the same linear polarization state, thereby completing the roundtrip without suffering losses. Circulating-radiation in the orthogonal eigen-polarization would return after a roundtrip in the resonator in the same orthogonal linear polarization state and would suffer high losses at the polarizer. Polarizer 28 is thereby used to select one of the two eigen-polarizations of resonator 14. The fiber-laser will accordingly deliver output laser-radiation with all power in a single, well defined, linear polarization state.

In polarized fiber-laser 10, mechanically aligning polarizer 28 with a linear eigen-polarization is replaced by keeping the polarizer orientation fixed and adding waveplate 26 between the polarizer and the gain-fiber 12. Rotating waveplate 26 aligns the plane-of-polarization of the linear eigen-polarization of resonator 14 with the plane-of-polarization of polarizer 28, thus achieving the same effect as rotating the polarizer. It should be noted that while waveplate 26 is preferably a half-waveplate, a waveplate having any retardance greater than or equal to a quarter wave would achieve the above discussed alignment of the plane-of-polarization.

Output laser-radiation from resonator 14 exits FBG 18 as a diverging beam. The output laser-radiation is reflected from dichroic reflector 22 and is collimated by a positive lens 32. The output laser-radiation is linearly-polarized having the orientation of the selected eigen-polarization at the FBG end of the resonator, designated arbitrarily by an arrow $P_F$.

Figure 2:
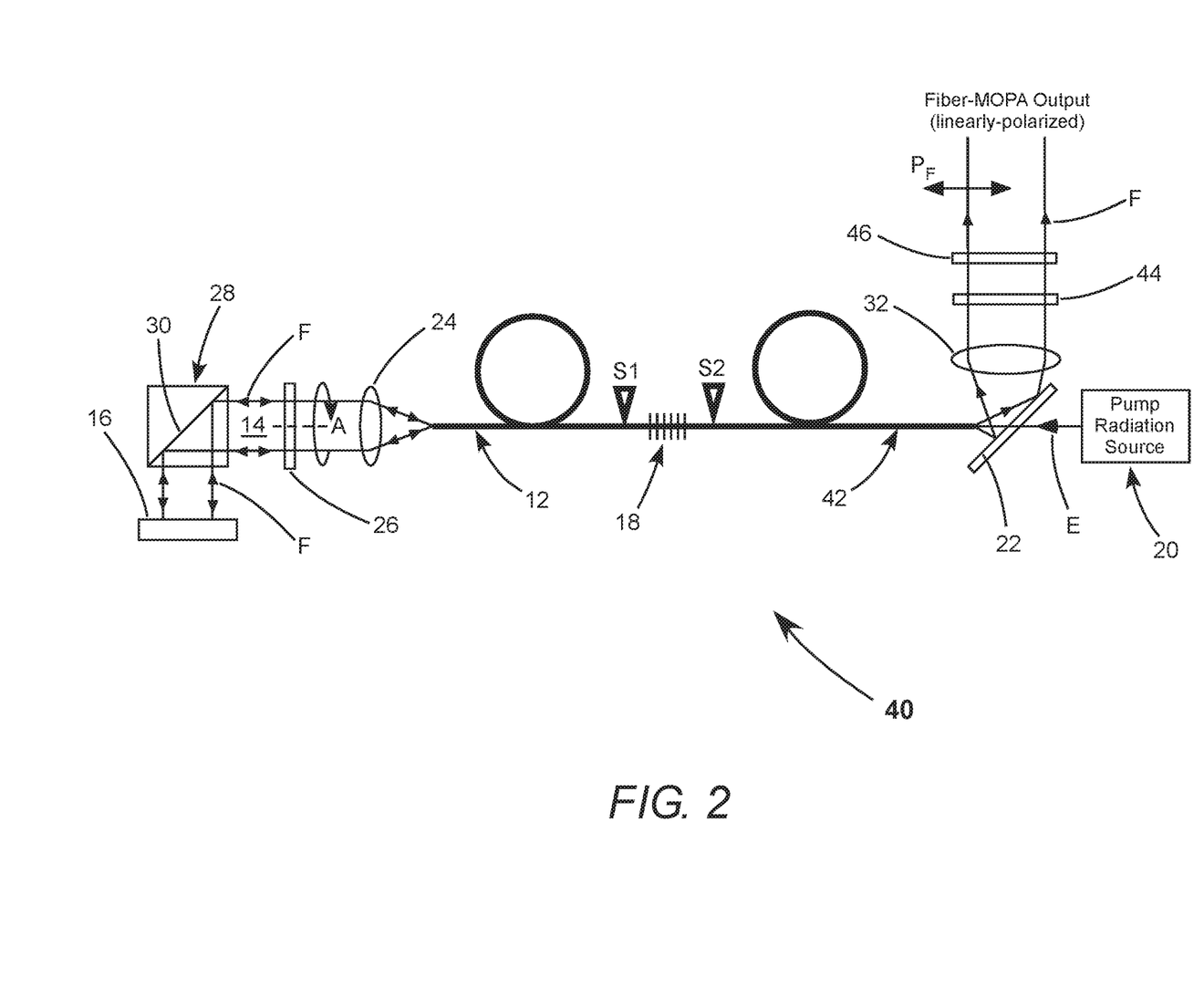
FIG. 2 schematically illustrates a preferred embodiment of a fiber master-oscillator power-amplifier (MOPA) in accordance with the present invention, wherein the master-oscillator is the polarized fiber-laser of FIG. 1, including the polarizer and the waveplate, and the power-amplifier is an amplifier-fiber

FIG. 2 schematically illustrates a preferred embodiment 40 of a fiber master-oscillator power-amplifier (MOPA) in accordance with the present invention, wherein the master-oscillator is polarized fiber-laser 10 of FIG. 1, including polarizer 28 and waveplate 26. An amplifier-fiber 42 is spliced to FBG 18 of polarized fiber-laser 10, as indicated by arrow S2, to receive the linearly-polarized output laser-radiation from fiber-laser 10. Here, the same pump-radiation source 20 is used to energize both gain-fiber 12 and amplifier-fiber 42. Those skilled in the art of fiber-laser engineering would recognize that the gain-fiber and amplifier-fiber could have different dedicated pump-radiation sources, without departing from the spirit and scope of the present invention.

Linearly-polarized laser-radiation from fiber-laser 10 will propagate through amplifier-fiber 42. The polarization state thereof will evolve due to any birefringence in the amplifier-fiber, so amplified laser-radiation delivered by amplifier-fiber 42 will, in general, be in a well-defined elliptical polarization state. Accordingly, the amplified laser-radiation can be brought back to a linearly polarized state by means of a suitably oriented quarter-waveplate 44 inserted into the beam collimated by lens 32. An optional half-waveplate 46 may be inserted into the collimated linearly-polarized beam to orient the plane-of-polarization to any desired angle.

Figure 3:
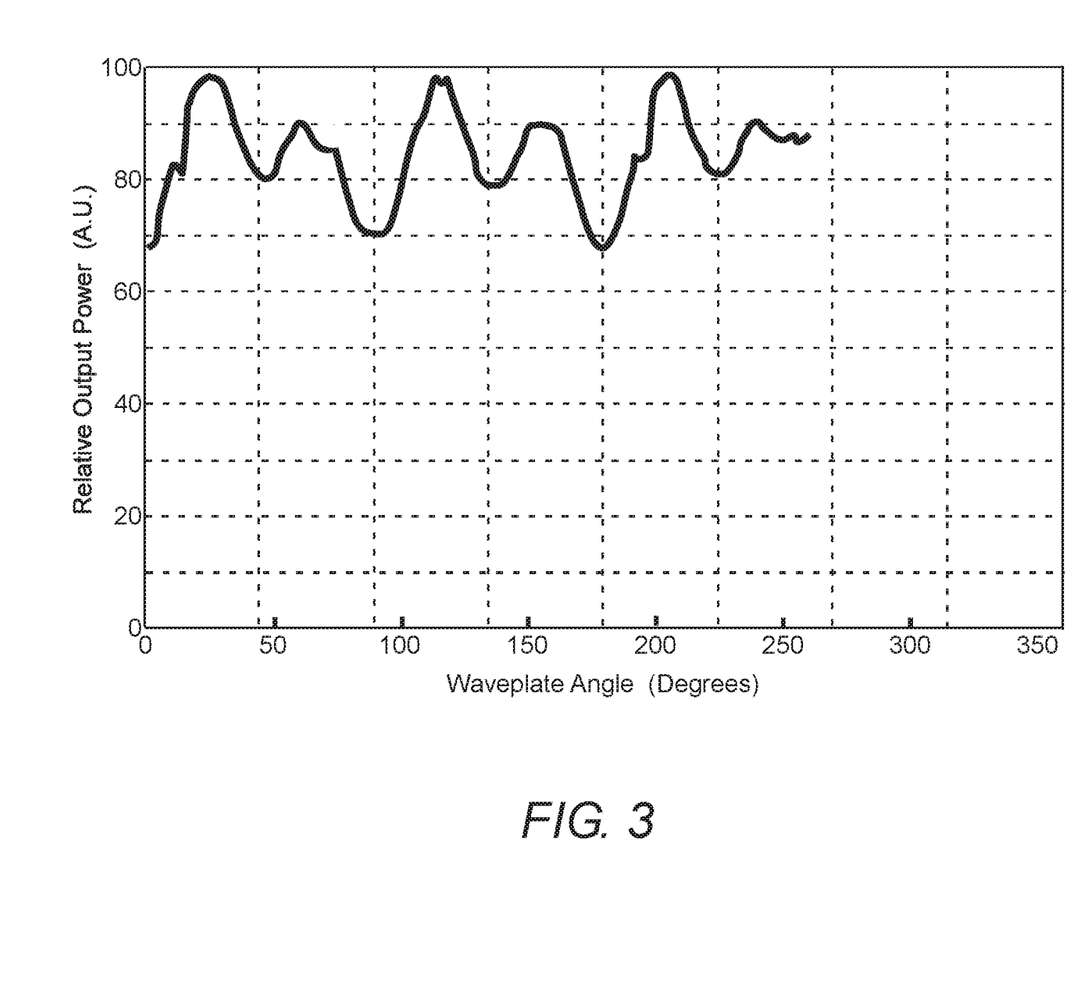
FIG. 3 is graph schematically illustrating measured relative output power as a function of rotation angle of the waveplate in the fiber-MOPA of FIG. 2.

FIG. 3 is a graph schematically illustrating measured relative output power as a function of rotation angle of waveplate 26 in an example of the fiber-MOPA of FIG. 2. Vertical ordinates (dashed) depicted on the graph are at 45-degree intervals. In this example, gain-fiber 12 and amplifier-fiber 42 are each ytterbium-doped fibers with a core-diameter of about 23 micrometers (μm). Gain-fiber 12 has a length of about 15.0 meters (m) and amplifier-fiber 42 has a length of about 15.0 m. The gain-fiber and the amplifier-fiber each have a NA of 0.04. FBG 18 has a peak reflectivity of about 10% at a wavelength of about 1080 nm, and a reflection bandwidth of about 0.5 nm. The pump-radiation has a wavelength of about 976 nm and is delivered at a power of about 1200 Watts (W).

In the graph of FIG. 3, power maxima correspond to rotation angles at which waveplate 26 of FIG. 2 aligns the orientation of an eigen-polarization with the plane-of-reflection of polarizer 28. Effectively, the waveplate alternately selects the two eigen-polarizations with successive rotations of 45° between power maxima. At power minima, the output power is reduced by about 30%. If such a loss were tolerable, polarized fiber-laser 10 could be operated without waveplate 26, i.e. with only polarizer 28.

Those skilled in the art would recognize from the above-presented description that alignment of the orientation of the eigen-polarization with polarizer 28 could be accomplished by correspondingly rotating an assembly that includes both polarizer 28 and plane reflector 16. Such an arrangement would, however, be complex compared with rotating a waveplate in a simple adjustable mount.

A particular advantage of delivering linearly-polarized laser-radiation is that such output can be frequency-converted in one or more optically nonlinear crystals to provide laser-radiation having a different wavelength. For example, by harmonic generation (frequency-addition) or optical parametric generation (frequency-division).

Figure 4:
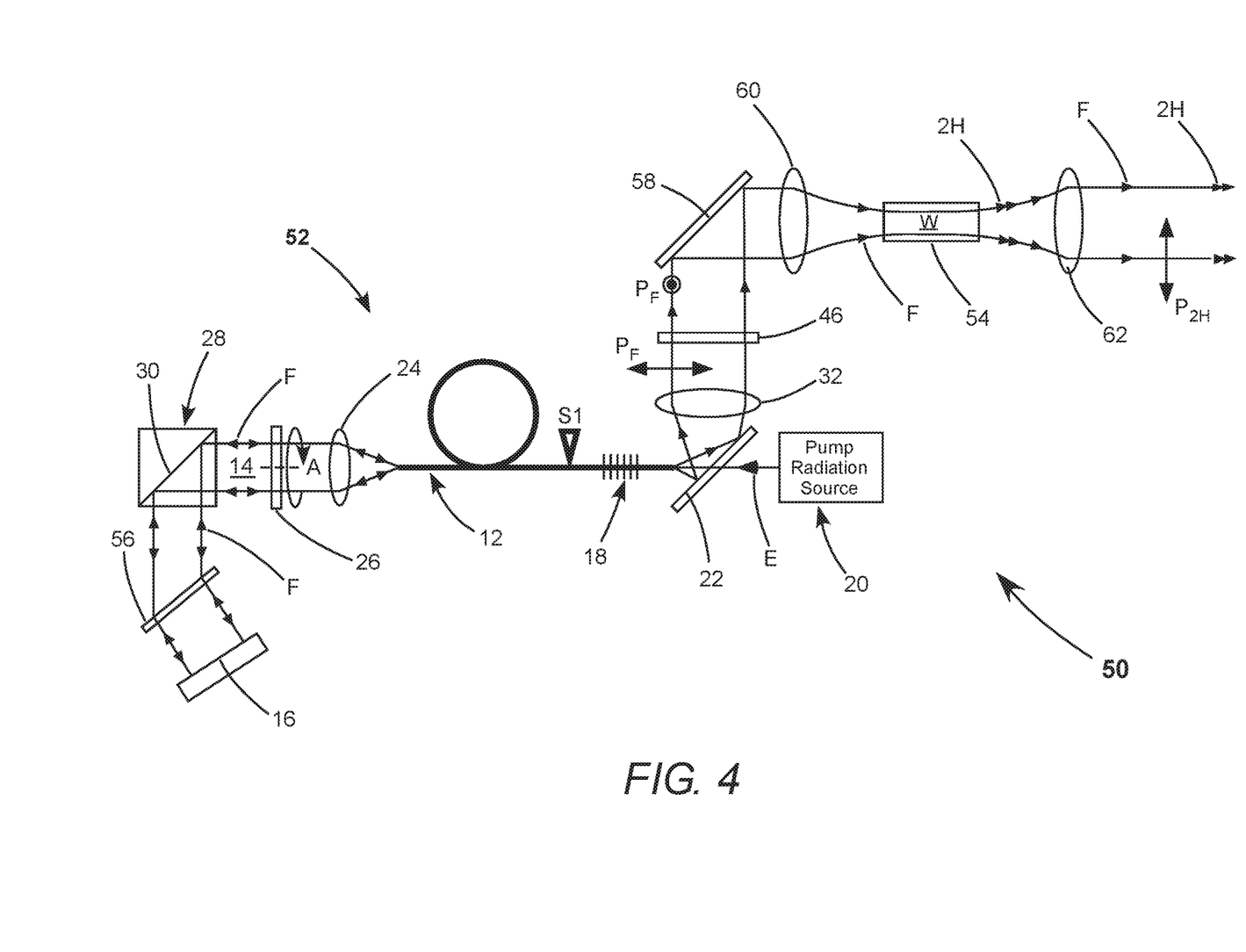
FIG. 4 schematically illustrates a preferred embodiment of a frequency-doubled polarized fiber-laser in accordance with the present invention, including a polarized fiber-laser similar to the polarized fiber-laser of FIG. 1, linearly-polarized fundamental-wavelength radiation thereof converted to second-harmonic radiation in a frequency-doubling arrangement, including an optically nonlinear crystal.

By way of example, FIG. 4 schematically illustrates a preferred embodiment 50 of a frequency-doubled polarized fiber-laser in accordance with the present invention. In this embodiment, linearly-polarized fundamental-wavelength radiation F delivered by a polarized fiber-laser 52 is converted to second-harmonic radiation 2H in an optically nonlinear crystal 54. Fiber-laser 52 is similar to fiber-laser 10 of FIG. 1, with an exception that a transmission grating 56 is inserted into the collimated beam between polarizer 28 and plane reflector 16. Grating 56 serves as an additional wavelength-selective element within resonator 14 for further narrowing the spectral bandwidth of fundamental-wavelength radiation, thereby maintaining fundamental-wavelength radiation within an acceptance bandwidth of nonlinear crystal 54.

Output laser-radiation from resonator 14 is linearly-polarized in the orientation of the selected eigen-polarization $P_F$. Half-waveplate 46 is included to rotate the output polarization to the orientation required for frequency-doubling in nonlinear crystal 54, which in this example is perpendicular to the plane of the drawing. The collimated polarized beam is directed by a plane mirror 58 to a positive lens 60, which focuses the fundamental-wavelength radiation to a beam-waist W in nonlinear crystal 54. Nonlinear crystal 54 converts a portion of the fundamental-wavelength radiation to second-harmonic radiation, which is indicated in the drawing by double arrows.

Residual fundamental-wavelength radiation and the second-harmonic radiation emerge from nonlinear crystal 54 as diverging beams, which are collimated by a positive lens 62. If only second-harmonic radiation is required, the second-harmonic radiation can be separated from the fundamental-wavelength radiation by a dichroic filter (not shown). Those skilled in the art, from the description provided herein, would recognize that further frequency-conversion stages can be added without departing from the spirit and scope of the present invention.

Figure 5:
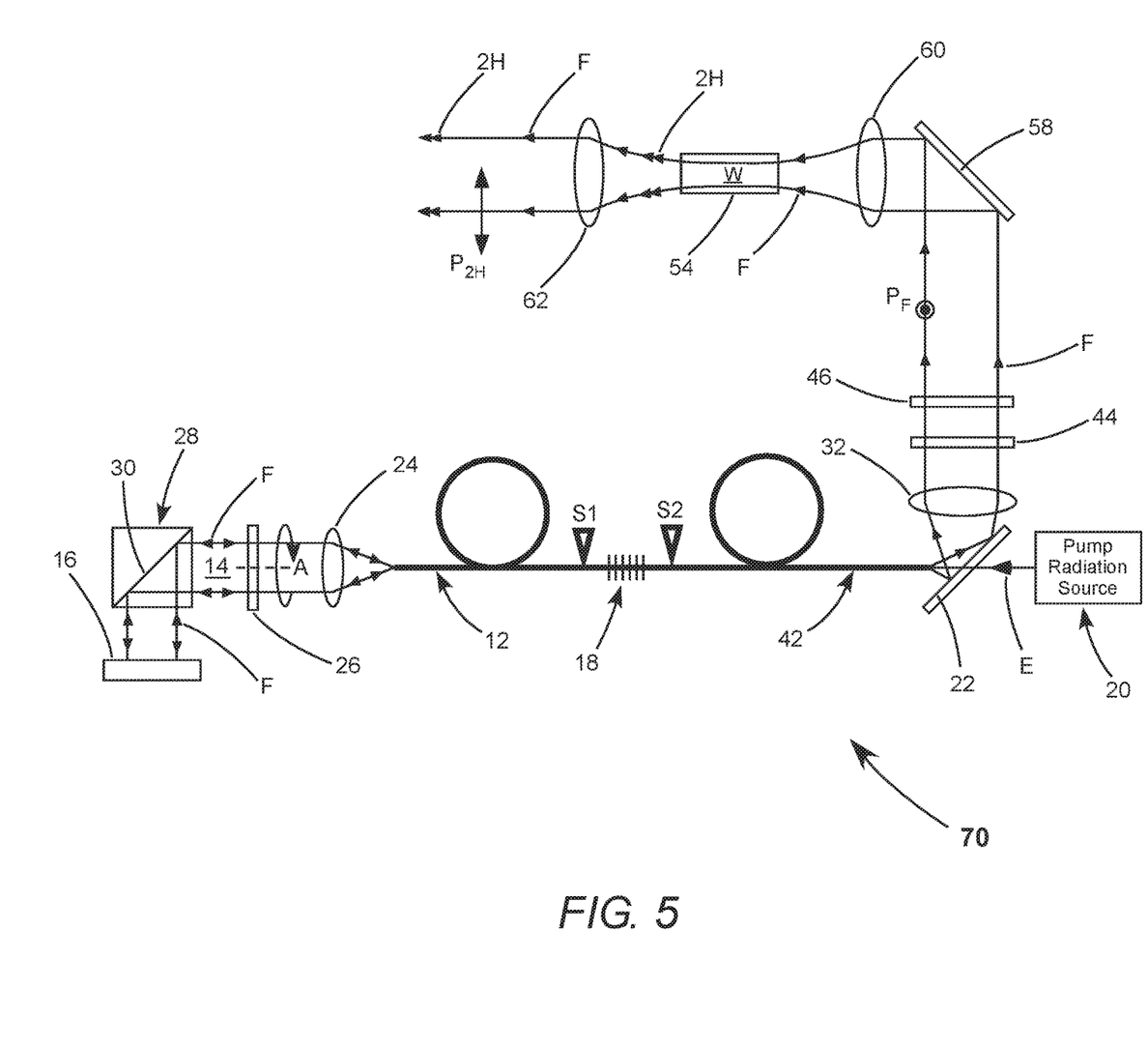
FIG. 5 schematically illustrates a preferred embodiment of a frequency-doubled fiber-MPOA in accordance with the present invention, wherein the polarized fiber-laser of FIG. 4 is the master-oscillator and the amplifier-fiber of FIG. 2 is the power-amplifier, the linearly-polarized output thereof frequency-doubled by the frequency-doubling arrangement of FIG. 4.

FIG. 5 schematically illustrates a preferred embodiment 70 of a frequency-doubled fiber-MPOA in accordance with the present invention. Here, a fiber-MOPA includes resonator 14 of FIG. 1 and amplifier-fiber 42 of FIG. 2. The linearly-polarized amplified fundamental-wavelength radiation is frequency-doubled by the second-harmonic generation arrangement of FIG. 4, including nonlinear crystal 54.

In the example discussed above having ytterbium-doped gain-fiber 12 and amplifier-fiber 42 delivering linearly-polarized amplified radiation at a fundamental wavelength of about 1080 nm, a nonlinear crystal made of lithium triborate ($LiB_3O_5$) could be used to convert the fundamental-wavelength radiation into second-harmonic radiation having a wavelength of about 540 nm.

Figure 6:
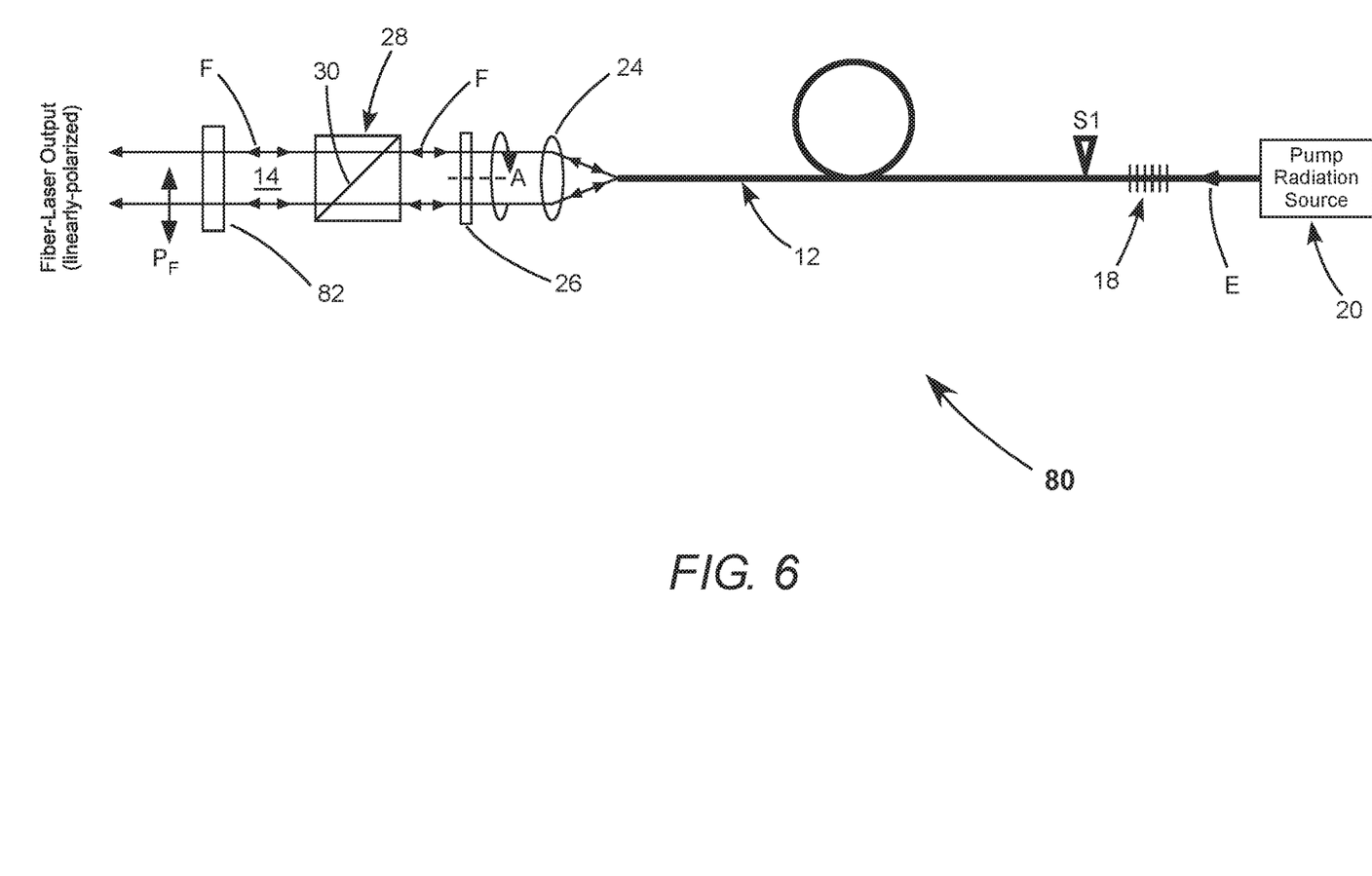
FIG. 6 schematically illustrates another preferred embodiment of a polarized fiber-laser in accordance with the present invention.

FIG. 6 schematically illustrates yet another preferred embodiment 80 of a polarized fiber-laser in accordance with the present invention, similar to polarized fiber-laser 10 of FIG. 1, with an exception that polarized laser-radiation is coupled out of resonator 14 through a plane reflector 82 instead of FBG 18. In this embodiment, fundamental wavelength radiation F circulates within resonator 14 between reflector 82 and FBG 18. FBG 18 is reflective at a fundamental wavelength selected from within the gain-bandwidth of gain-fiber 12 and reflector 82 is partially reflective at that fundamental wavelength. The reflection bandwidth of FBG 18 limits the spectral bandwidth of output laser-radiation from polarized fiber-laser 80.

In summary, the present invention is described above with reference to preferred embodiments. The invention is not limited, however to the embodiments described and depicted herein. Rather the invention is limited only by the claims appended hereto.

What is claimed is:

1. Fiber-laser apparatus, comprising:
a laser-resonator including a gain-fiber, the laser-resonator terminated at first and second ends thereof by respectively first and second reflectors, the laser resonator having two orthogonal linear eigen-polarizations and wherein all the fibers in the laser-resonator, including the gain-fiber, are non-polarization maintaining fibers;
a pump-radiation source arranged to provide pump-radiation to the gain-fiber and cause laser-radiation to circulate in the laser-resonator and laser-radiation to be delivered by the laser resonator;
a polarizer located between one of the reflectors and the gain-fiber, the polarizer arranged to select one of the two eigen-polarizations, the laser radiation circulating in the laser resonator in only the selected eigen-polarization, thereby causing the laser-radiation delivered from the laser-resonator to be linearly-polarized; and
a wavelength-selective device located in the laser-resonator for selecting the wavelength of the delivered radiation from within a gain-bandwidth of the gain-fiber.

2. The apparatus of claim 1, further including a waveplate located between the polarizer and the gain-fiber.

3. The apparatus of claim 2, wherein the waveplate has a retardance greater than or equal to a quarter wave.

4. The apparatus of claim 3, wherein the waveplate is a half-waveplate.

5. The apparatus of claim 1, wherein the polarizer is a cube-prism polarizer.

6. The apparatus of claim 1, wherein the gain-fiber is a single-mode gain-fiber.

7. The apparatus of claim 1, wherein the gain-fiber is a ytterbium-doped fiber.

8. The apparatus of claim 1, wherein one of the reflectors is a fiber Bragg grating.

9. The apparatus of claim 8, wherein the fiber Bragg grating has a reflection bandwidth of about 0.5 nm or less.

10. The apparatus of claim 1, further including an amplifier-fiber, the amplifier-fiber arranged to receive the linearly-polarized laser-radiation from the laser-resonator, the amplifier-fiber delivering amplified laser-radiation.

11. The apparatus of claim 10, wherein the amplifier-fiber is a ytterbium-doped fiber.

12. The apparatus of claim 10, further including a quarter-waveplate, the quarter-waveplate inserted into the amplified laser-radiation and oriented to bring the amplified laser-radiation back to a linearly-polarized state.

13. The apparatus of claim 12, further including a half-waveplate inserted into the linearly-polarized amplified laser-radiation, the half-waveplate orienting the plane-of-polarization to any desired angle.

14. The apparatus of claim 1, further including an optically nonlinear crystal that converts the linearly-polarized laser-radiation to laser-radiation having a different wavelength.

15. The apparatus of claim 14, wherein the optically nonlinear crystal converts the linearly-polarized laser-radiation to second-harmonic radiation.

16. The apparatus of claim 1, wherein the wavelength-selective device is a transmission grating.

17. Fiber-laser apparatus, comprising:
a gain-fiber;
a first reflector and a second reflector, the first and second reflectors located at opposite ends of the gain-fiber and arranged to form a laser-resonator, the laser resonator having two orthogonal linear eigen-polarizations and wherein all the fibers in the laser-resonator, including the gain-fiber, are non-polarization maintaining fibers;
a pump-radiation source arranged to deliver pump-radiation to the gain-fiber and thereby energize the gain-fiber, the energized gain-fiber causing laser-radiation to circulate within the laser-resonator;
a wavelength-selective element for selecting a wavelength and a spectral bandwidth of the circulating laser-radiation from within a gain-bandwidth of the energized gain-fiber, the first reflector being partially reflective at the selected wavelength, a portion of the laser-radiation delivered from the laser-resonator through the first reflector; and
a polarizer located between the energized gain-fiber and the second reflector, the polarizer aligned with one of the two eigen-polarizations of the laser-resonator such that the circulating laser radiation has only the aligned eigen-polarization and the delivered laser-radiation is linearly-polarized.

18. The apparatus of claim 17, further including an optically nonlinear crystal that converts the linearly-polarized laser-radiation to second-harmonic radiation.

* * * * *